(12) United States Patent
Spivey et al.

(10) Patent No.: US 12,229,553 B2
(45) Date of Patent: Feb. 18, 2025

(54) SYSTEMS AND METHODS OF USING A SOFTWARE DEVELOPER PROXY TOOL FOR SOFTWARE DEVELOPMENT

(71) Applicant: Change Healthcare Holdings, LLC, Nashville, TN (US)

(72) Inventors: Henry Spivey, Nashville, TN (US); Chun-Fu Chang, Nashville, TN (US); Wei-Yuan Lo, Nashville, TN (US)

(73) Assignee: Change Healthcare Holdings, LLC, Nashville, TN (US)

( * ) Notice: Subject to any disclaimer, the term of this patent is extended or adjusted under 35 U.S.C. 154(b) by 192 days.

(21) Appl. No.: 18/050,746

(22) Filed: Oct. 28, 2022

(65) Prior Publication Data

US 2024/0143322 A1 May 2, 2024

(51) Int. Cl.
*G06F 8/77* (2018.01)

(52) U.S. Cl.
CPC ..................... *G06F 8/77* (2013.01)

(58) Field of Classification Search
None
See application file for complete search history.

(56) References Cited

U.S. PATENT DOCUMENTS

| | | | | |
|---|---|---|---|---|
| RE48,507 E | * | 4/2021 | Palladino | G06F 9/44 |
| 2003/0070006 A1 | * | 4/2003 | Nadler | G06F 9/548 |
| | | | | 719/330 |
| 2003/0208640 A1 | * | 11/2003 | Just | G06F 9/548 |
| | | | | 719/330 |
| 2006/0179150 A1 | * | 8/2006 | Farley | H04L 67/1001 |
| | | | | 709/228 |
| 2012/0290749 A1 | * | 11/2012 | Moench | H04L 67/565 |
| | | | | 710/63 |
| 2018/0152534 A1 | * | 5/2018 | Kristiansson | H04L 67/56 |
| 2019/0028360 A1 | * | 1/2019 | Douglas | H04L 41/22 |
| 2022/0091830 A1 | * | 3/2022 | Ionescu | G06F 8/433 |
| 2024/0143493 A1 | * | 5/2024 | Michael | G06F 11/3688 |

OTHER PUBLICATIONS

R. V. Tkachuk, D. Ilie and K. Tutschku, "Towards a Secure Proxy-based Architecture for Collaborative AI Engineering," 2020 Eighth International Symposium on Computing and Networking Workshops (CANDARW), Naha, Japan, 2020, pp. 373-379. (Year: 2020).*

* cited by examiner

*Primary Examiner* — Andrew M. Lyons
(74) *Attorney, Agent, or Firm* — MARSHALL, GERSTEIN & BORUN LLP

(57) ABSTRACT

A software developer proxy tool accesses microservice applications for a software development project by connecting the developer proxy tool to a common port on a computer network. The tool implements software and hardware to register a plurality of the microservice applications on connection ports that connect to the developer proxy tool at an address for the common port. Data requests among the microservices are handled by the developer proxy tool via the common port. The tool sequentially queries selected microservice applications on the respective connection ports to determine availability for completing a request. The tool receives responses back from microservices and directs the responses back to the requesting program. Failed requests trigger use of remote or third party microservice applications that may be available over an internet connection.

20 Claims, 9 Drawing Sheets

SYSTEMS AND METHODS OF USING A SOFTWARE DEVELOPER PROXY TOOL FOR SOFTWARE DEVELOPMENT

BACKGROUND

Software developers need to run program development, editing, and testing projects on a computer to develop new computer program features, fix bugs, or make enhancements. A developer's routine often involves running more than one software development service at a time, which can contribute to a cumbersome and inconvenient software development process. Additionally, many software development projects utilize software engineering platforms requiring certain specialized functions, and those functions are accomplished by utilizing both internal features of a software development package, or even a software text editor, as well as using enhancements available from a microservice architecture.

Without limiting the kinds of programming services that would fall within a "microservice architecture," microservices generally include computer programs, particular software modules, open-source code, third party proprietary software, and the like. Microservices are often available to be permanently installed on a user's local computer device or a server, or may be accessible over a data network. Microservices often provide active processing services and discrete software functions or may include sections of computer code for use elsewhere. The microservices are called when a software development project sends data processing requests to a particular microservice application that is either stored directly on a developer's computer or accessed over a data communications network connection to a local or remote server. The server may be local to the developer's computer or available from a different server that is remote or in the cloud. With so many microservices located on disparate servers and over numerous communications links, developers may need to start multiple services and manually organize these services' interconnections. Furthermore, these services can have different startup settings that need to be configured manually just to start on work.

There are currently no solutions that make connections easier between local software development platforms or text editors and a multitude of microservices. This problem is particularly acute when software development projects require services that are simultaneously put to use.

BRIEF SUMMARY OF THE DISCLOSURE

In an implementation of the following disclosure, a computer implemented method uses a developer proxy tool stored in memory on a computer to access microservice applications for a software development project. The method includes connecting the developer proxy tool to a common port on the computer and registering a plurality of the microservice applications to the developer proxy tool. By assigning respective connection ports for each of the plurality of microservice applications, the respective connection ports communicate with the developer proxy tool on the common port. The method includes providing an address for the common port to the plurality of microservice applications. Transmitting data requests from at least one requesting microservice to the developer proxy tool occurs via the common port. The developer proxy tool sequentially queries selected microservice applications on the respective connection ports to determine availability of the selected microservice applications for completing a respective data request. The method includes receiving, at the common port, either a local microservice response to the respective data request from one of the selected microservice applications or an error message indicating that none of the plurality of microservice applications can fulfill the respective data request. Upon receiving the error, the proxy development tool directs the respective data request to a third party microservice application and receives a third party response to the respective data request. The method further includes sending the local microservice response or the third party response to the requesting microservice.

In another aspect, a computer program product implements a developer proxy tool used with a software development project on a computer, the computer program product includes computer readable program code embodied in a non-transitory computer readable storage medium, the program code being executable by a processor to perform operations. The operations include configuring a user interface for entering a common port address for the developer proxy tool and registering a plurality of microservice applications to the developer proxy tool. By assigning respective connection ports for each of the plurality of microservice applications, the respective connection ports communicate with the developer proxy tool on the common port. The method includes providing an address for the common port to the plurality of microservice applications. Transmitting data requests from at least one requesting microservice to the developer proxy tool occurs via the common port. The developer proxy tool sequentially queries selected microservice applications on the respective connection ports to determine availability of the selected microservice applications for completing a respective data request. The method includes receiving, at the common port, either a local microservice response to the respective data request from one of the selected microservice applications or an error message indicating that none of the plurality of microservice applications can fulfill the respective data request. Upon receiving the error, the proxy development tool directs the respective data request to a third party microservice application and receives a third party response to the respective data request. The method further includes sending the local microservice response or the third party response to the requesting microservice.

In another aspect a system for completing a software development task includes a developer proxy tool having computer software components stored in computerized memory accessible by a local computer, wherein the computer software components are configured to prompt a user to enter project data. The project data may include an address for a common port on a data network for communicating with the developer proxy tool and identification of a plurality of microservice applications to run during the software development task. The computer software component implements a computerized method that includes assigning respective connection ports for each of the plurality of microservice applications, wherein the respective connection ports communicate with the developer proxy tool on the common port. The method includes providing an address for the common port to the plurality of microservice applications and transmitting data requests from at least one requesting microservice to the developer proxy tool via the common port. The developer proxy tool sequentially queries selected microservice applications on the respective connection ports to determine availability of the selected microservice applications for completing a respective data request. The developer proxy tool receives, at the common port, either a local microservice response to the respective data request from one of the selected microservice applications or an error message indicating that none of the plurality of microservice applications can fulfill the respective data request. Upon receiving the error, the proxy development tool directs the respective data request to a third party microservice application and receives a third party response to the respective data request. The proxy development tool may send sending the local microservice response or the third party response to the requesting microservice.

DETAILED DESCRIPTION

Figure 1:
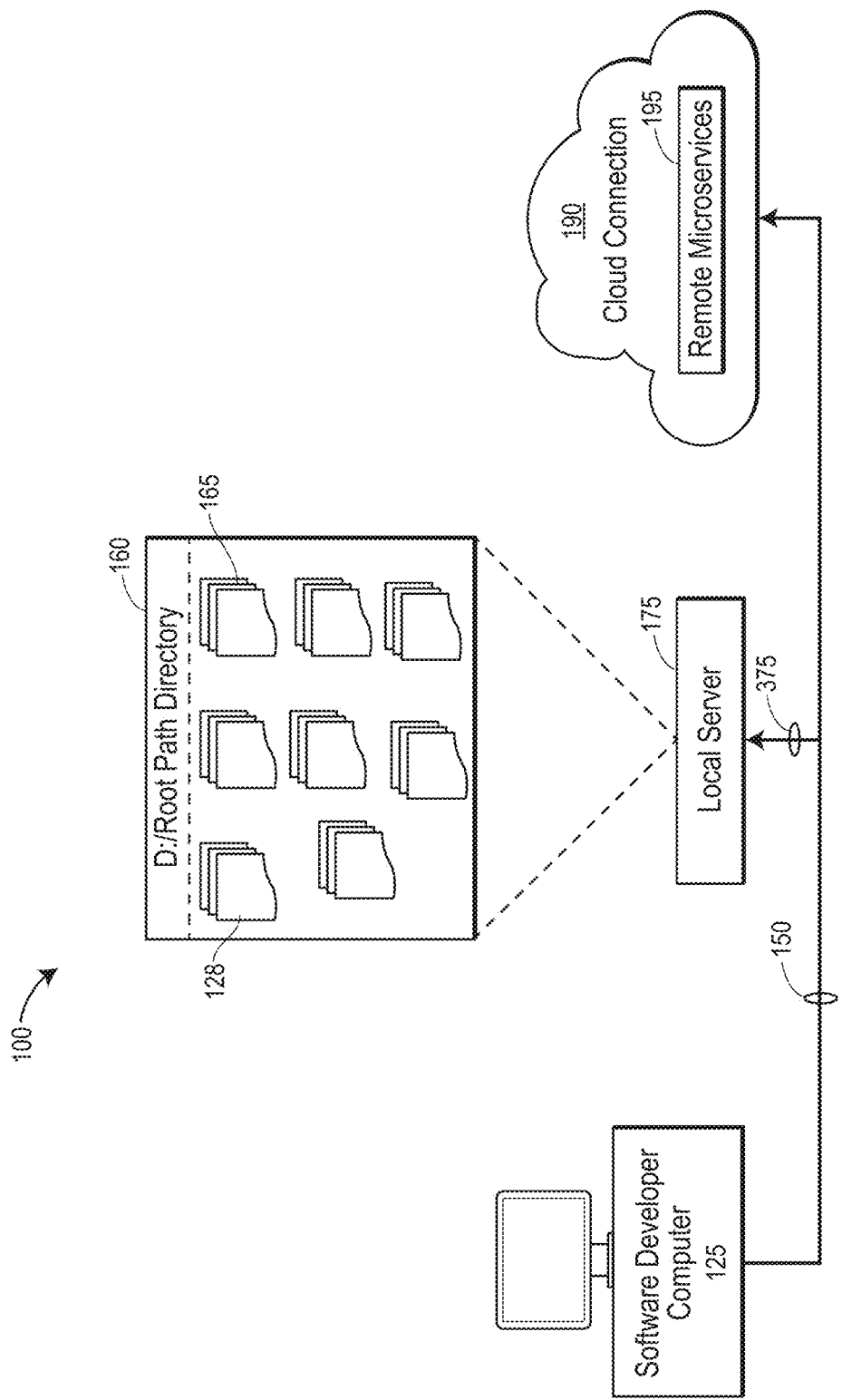
FIG. 1 is a schematic diagram showing an overview environment for using a developer proxy tool according to aspects of this disclosure.

This disclosure includes a computer program that operates as a proxy for a software developer who would ordinarily operate a developer's computer 125 manually to connect a software development application 128 to various files and service programs on the computer and/or a local server 175 as well as to microservices 165, 195 available across a data network 150. The computer program that operates as a proxy is referred to as a "developer proxy tool" 330 herein because it is another useful, automated software-based accessory that a software developer can use to add efficiency to a software project's development. The software developer proxy tool automates many of the steps that software developers would previously have to configure manually. The developer proxy tool 330 may be stored in a computer readable medium on an individual developer's computer 125 (e.g., personal computer, laptop, portable device, smartphone, or any machine that provides data processing and software development applications). The developer proxy tool may be accessible to the software developer directly on the developer's computer 125 and/or with an application program interface connected to a local server 175, either of which enables data entry through a graphical user interface on the developer's computer 125 as discussed below. The developer proxy tool 330 may have access to computer memory 610 to maintain information that is transmitted to and from the developer proxy tool 330 across a data network 150 and even within internal connections of the developer's computer 125. References to a developer's computer 125 are not limited to any one type or number of computers but is representative of any machine or system with computer processors and memory or any combination of multiple machines that distribute processing power across numerous computerized devices.

The first step of using the developer proxy tool 330 is to run a start script 200, as shown by example in FIG. 2, that guides the developer through a few questions to set desired configuration settings. These configuration settings 225, 230, 235 are necessary to orchestrate network calls among selected microservices 165, 195 or any given software development project 128 accessed for a software development task. The first question asks for a root path 160 to a project's directory on the developer's computer 125, which may include a local server 175 on which the software developer is working to develop or edit software. The start script 200 may request a root path 160 because in some non-limiting embodiments, it will eventually navigate to intended microservices within this directory to start up and communicate with a software development project 128 used within the directory. The second question 230 asks for a common port 375 on a data communications network 150 for the developer proxy tool 330 to run on during communications over the data communications network 150. Incoming requests originating from the numerous microservices 165, 195 at use may go through this common port 375 to communicate over a data communications network 150. Requests among the microservices 165 to each other and/or to any aspect of the software development project 128 underway will likewise end up on this common port 375. The last question prompted by the software developer proxy tool 300 asks which microservices 165 the developer wishes to start. The inputs 219 answering these questions may be entered into the developer's computer 125 via numerous different channels including but not limited to text inputs, voice inputs, or any communications channel that can be converted to text or any data format that can be used by the computer. With these inputs 219 gathered, the script 200 navigates to each microservice 165 using the root path 160 specified as part of a communications protocol in use. If the microservice 165 is found on the developer's local server 175, the script 200 will attempt to start that service and apply the configuration settings 225, 230, 235 specified when the script was executed. The developer proxy tool 330 may reach out to other networks 190 for microservices 195 that are not available on a local server 175.

Once the necessary services are started, the developer proxy tool 330 works, in part, by fielding incoming requests for microservice assistance to the common port 375 on which the developer proxy tool 330 is running. The running microservices will use the specified common port 375 at script execution time as a base uniform resource locator or "base URL." This base URL may be the same for each running service 128, 165, thus ensuring that all service level HTTP requests are handled by the developer proxy tool 330. All HTTP request methods such as GET, POST, PUT, and DELETE are supported and take an entire HTTP request as input including all headers, body, query parameters, etc.

Computer memory 610 associated with the developer proxy tool accommodates receiving, storing, and processing these requests.

The next stage of a microservice request determines where it should be handled. An incoming HTTP request from another microservice will be handled and sent to the appropriate locally running microservice 165 if found. This is accomplished as shown in non-limiting examples of FIG. 3 and FIG. 4 by performing a "health" check 410, 420 on a series of predetermined ports 1234, 1235, 1236. These port numbers are configurable and match the range of ports for the developer's needs. To determine if a locally running microservice 165 can handle the incoming request for a given route, the developer proxy tool 330 takes the root path 160 of the request and requests a "health" endpoint (/health) 410, 420. In one non-limiting example, a "healthy" response 420 will return a JSON object with data containing a successful status message as shown in FIG. 4. An "unhealthy" response (i.e. an HTTP error) 505 will not return this message and must be handled otherwise as shown in FIG. 5. In this case an existing Amazon Web Services ("AWS") 195 instance URL 190 is used as a backup to handle this request. This AWS URL is configurable and should point to the deployed AWS instance 195 to handle this failed request. In either case, the incoming request will be handled in a non-breaking manner. When the request completes, its JSON response including status code, messages, and data is returned through the developer proxy tool 330 for further processing which could be another application.

Figure 2A:
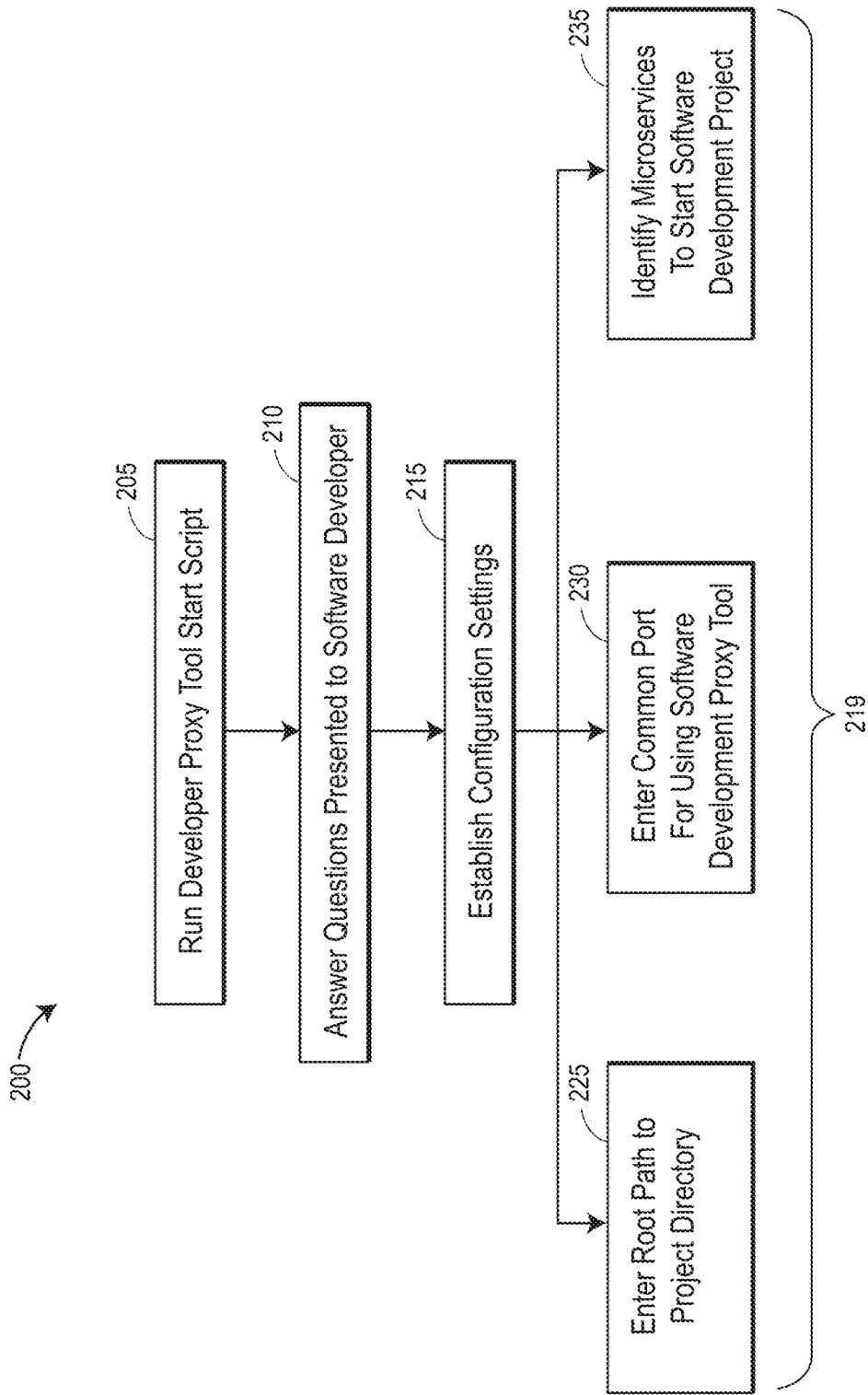
FIG. 2A is a schematic diagram showing aspects of a start up script to initiate a developer proxy tool for use in software development projects according to this disclosure.
Figure 2B:
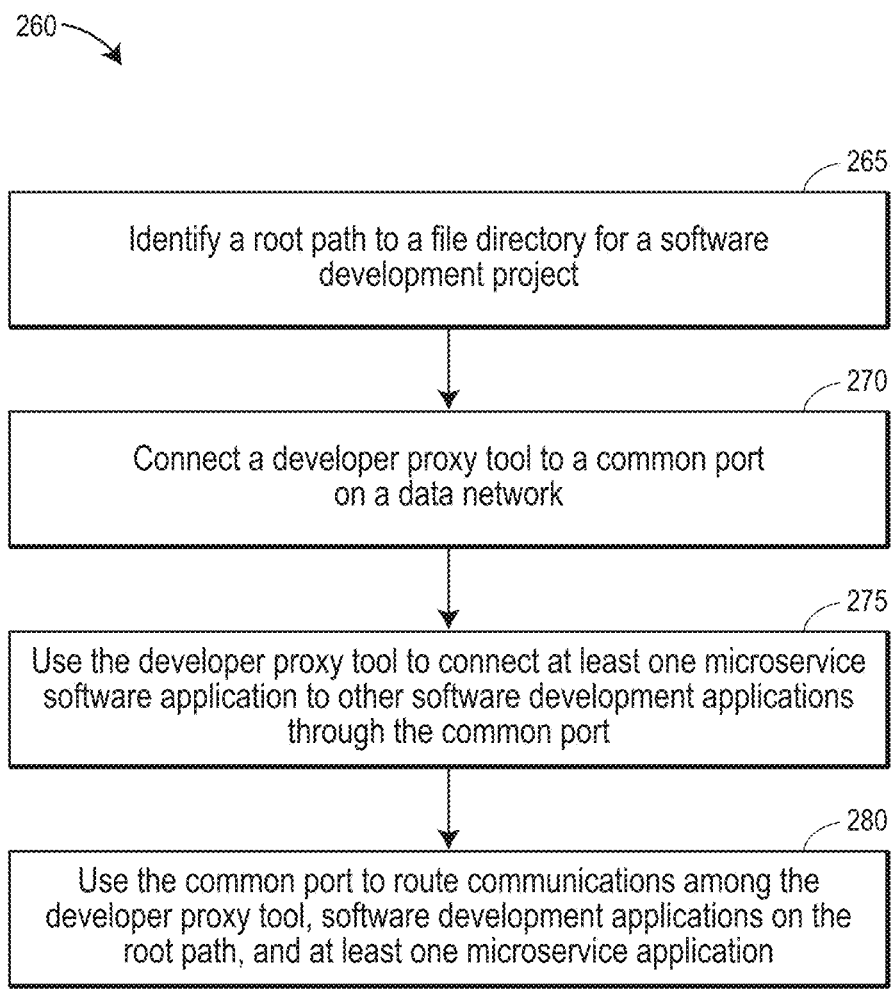
FIG. 2B is a schematic diagram showing aspects of a method of using a developer proxy tool in software development according to this disclosure.

FIGS. 1, 2A, and 2B illustrate a non-limiting embodiment of a computer implemented method of accessing microservices 165 used with software development applications 128 that may be resident on a developer's computer 125 or on a local server 175. In one example implementation, the method includes identifying a root path 160 to a file directory of a computer such as a local server 175 for accessing numerous software development applications 128. The developer's computer 125, typically via a local server 175, may be used to connect a developer proxy tool 330, stored in computer memory, to a common port 375 on a data network 150 and to the software development applications 128 and microservices 165 on the root path 160. The developer proxy tool 330 connects at least one microservice software application 165 to other microservices through the common port 375. The method, therefore, uses a common port 375 to route communications among the developer proxy tool 330 and the at least one microservice software application 165, 195. A software developer using a software developer's computer 125 and/or a local server 175 can use the method of this disclosure for receiving and storing data requests 405, as shown in FIG. 4, from the software development applications 128, and responses 430 from the at least one microservice software application 165, in designated portions of the computer memory for use by the developer proxy tool 330.

Figure 3:
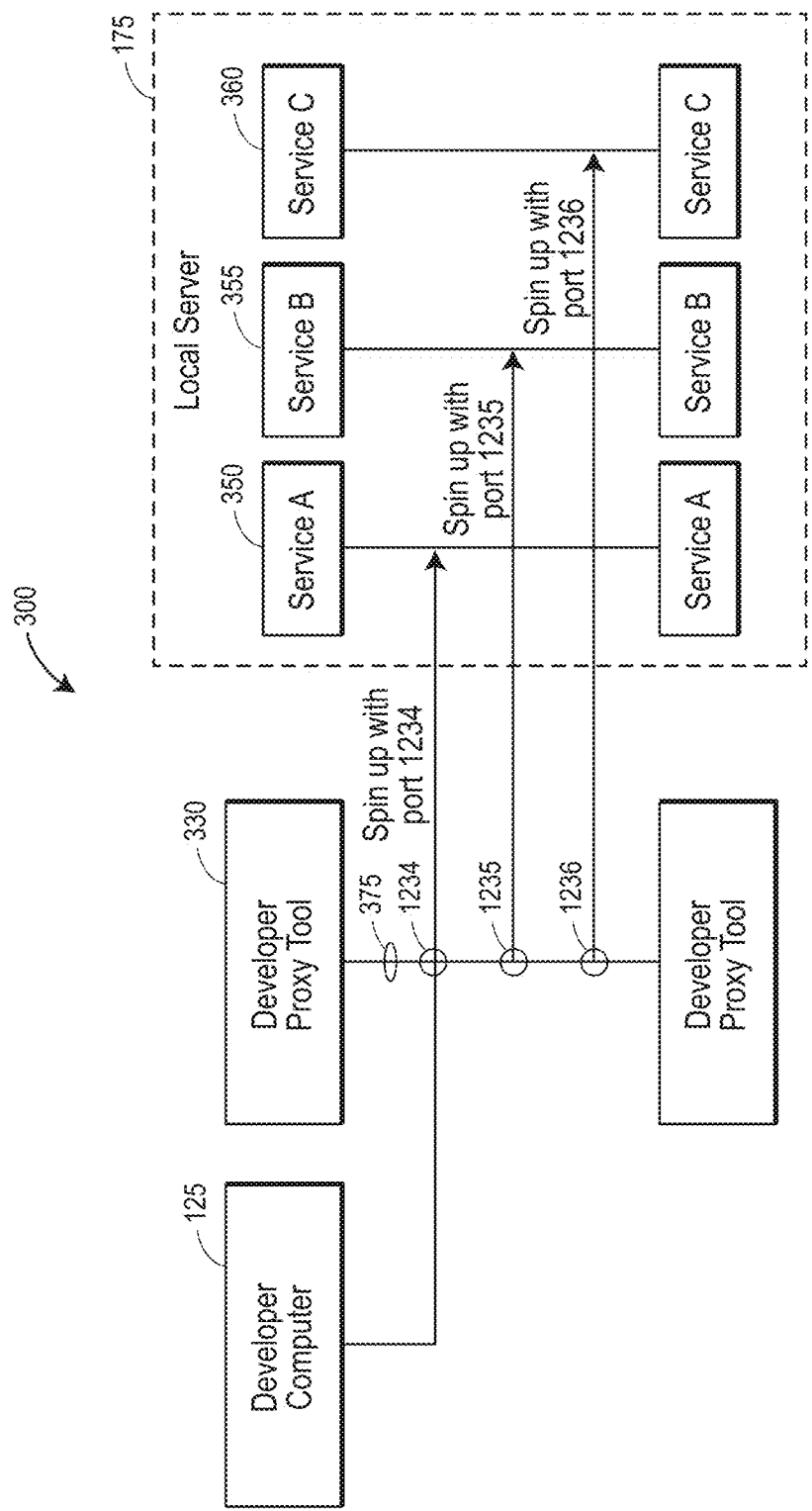
FIG. 3 is a schematic diagram showing a software developer's computer or local server utilizing a developer proxy tool in accordance with the description herein.
Figure 4:
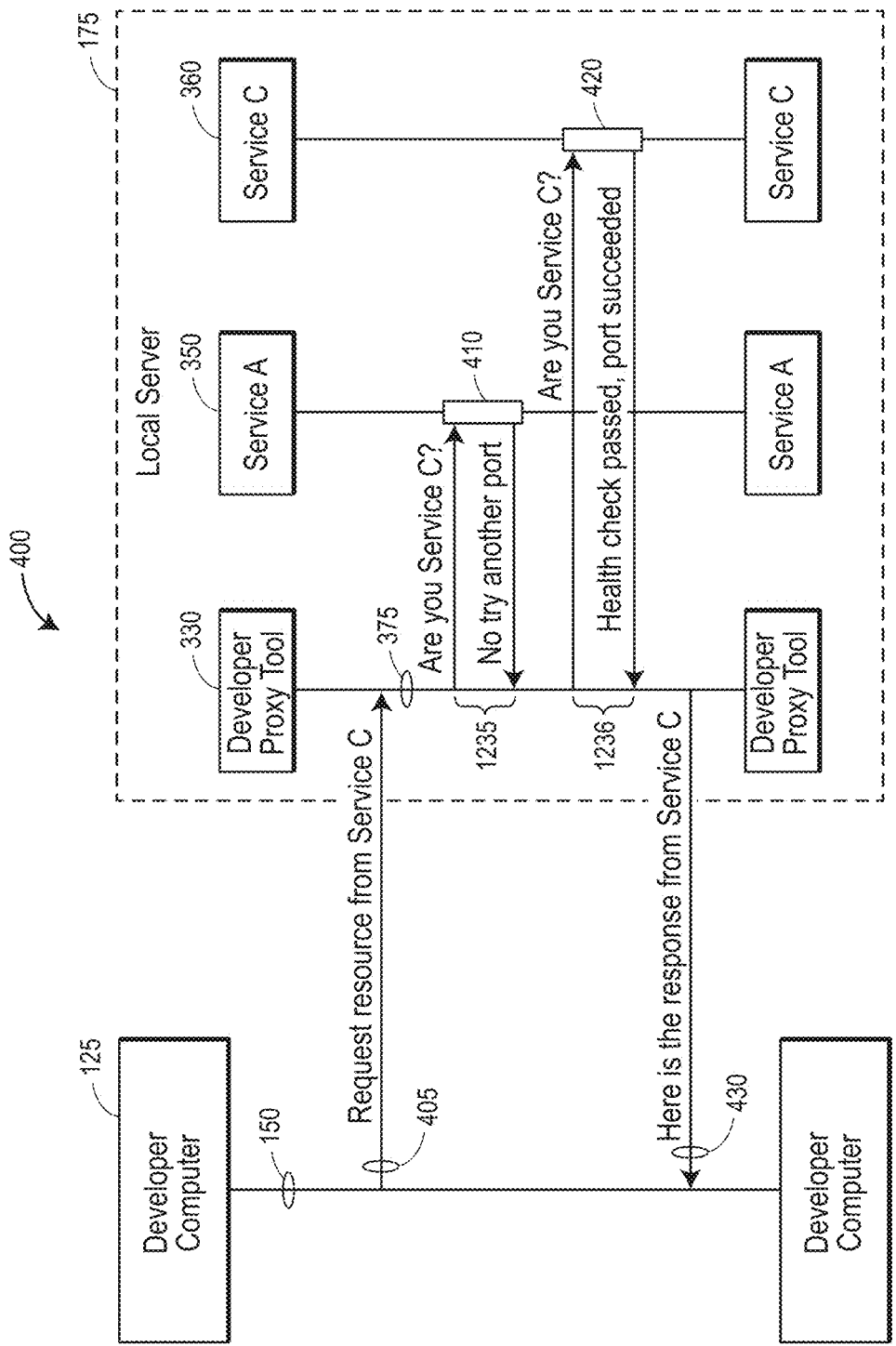
FIG. 4 is a schematic diagram showing a software developer's computer or local server managing communications to and from microservices available on local network connections according to aspects of this disclosure.
Figure 5:
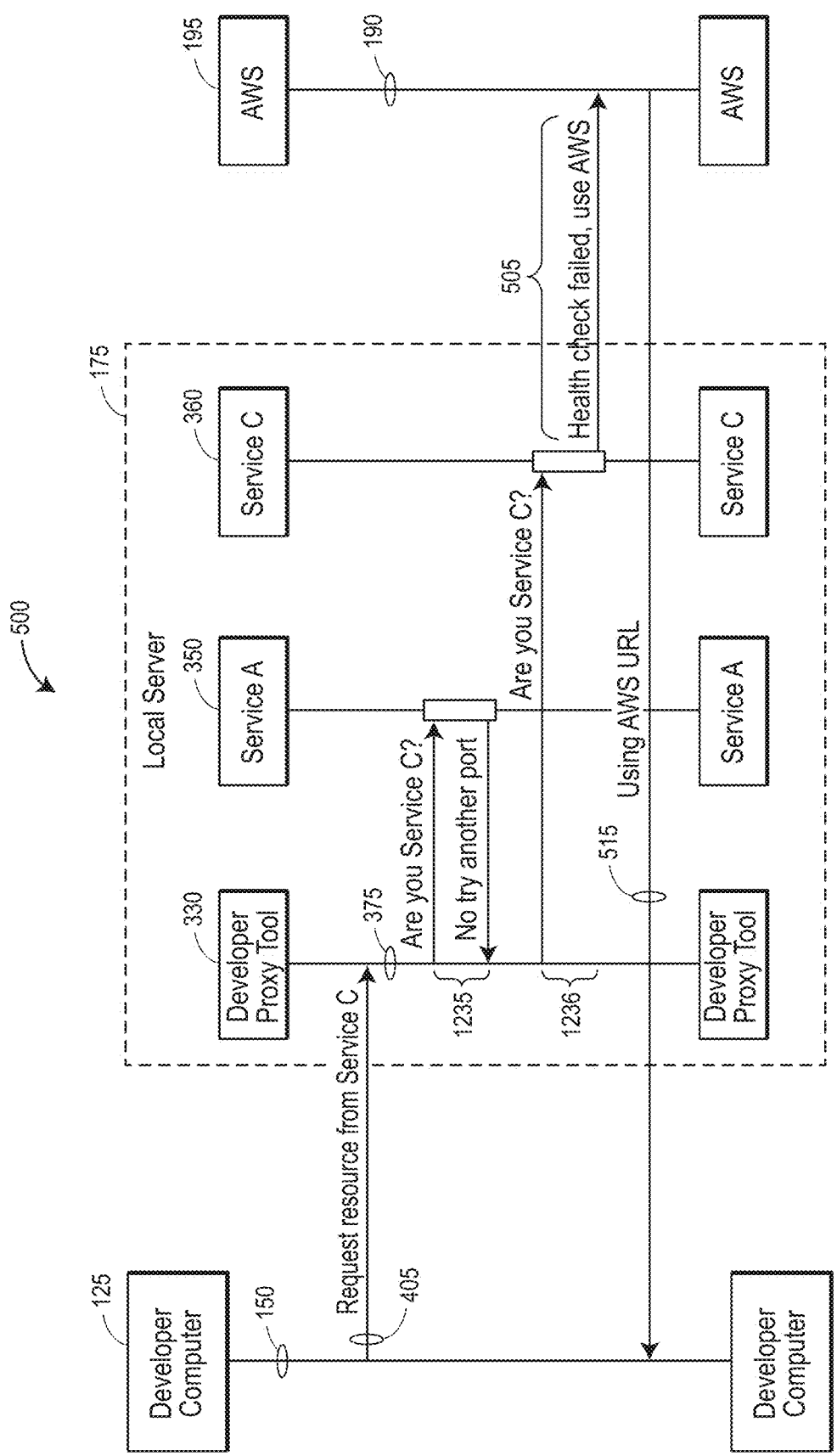
FIG. 5 is a schematic diagram shows an example of a software developer's computer or local server managing communications to and from microservices available on local network connections and other microservices only available on remote or cloud based data networks according to aspects of this disclosure.

The computer implemented method of this disclosure is further shown in FIGS. 3, 4, and 5 illustrating how the developer proxy tool 330 polls a selected set of ports 1234, 1235, 1236 to determine if the at least one microservice software application 350, 355, 360 is available on the developer's computer 125 or on a local server 175. In some embodiments, the developer proxy tool 330 uses respective microservices 165, 350, 355, 360 with a local data connection 150 if available. Other microservices 195 are accessible across a cloud data connection 190 if a local instance is not available for the other microservices 195. When a local data connection 150 cannot provide a requested microservice to or from the root directory 160 in which a project is active, the method includes connecting the other microservices 195 to the developer proxy tool 330 with a previously saved uniform resource locator (i.e., a base URL) stored on the developer's computer 125 or a local server 175. The cloud responses 515, shown in FIG. 5 are received from the previously saved uniform resource locator in designated portions of the computer memory for use by the developer proxy tool. As further shown in FIG. 5, the developer proxy tool 330 is configured to make the cloud responses 515 available to at least one microservice software application in use during a software development project. As shown in FIGS. 3-5, the method of using the developer proxy tool 330, therefore, includes connecting the at least one microservice software application 165, 350, 355, 360 and possibly a plurality of the microservices to the developer proxy tool 330. The plurality of microservices may connect to the common port 375 from diverse ports 1234, 1235, 1236 on an appropriate data network 150, 190. The plurality of microservices 165, 350, 355, 360 may be operated simultaneously in some non-limiting embodiments.

Figure 2C:
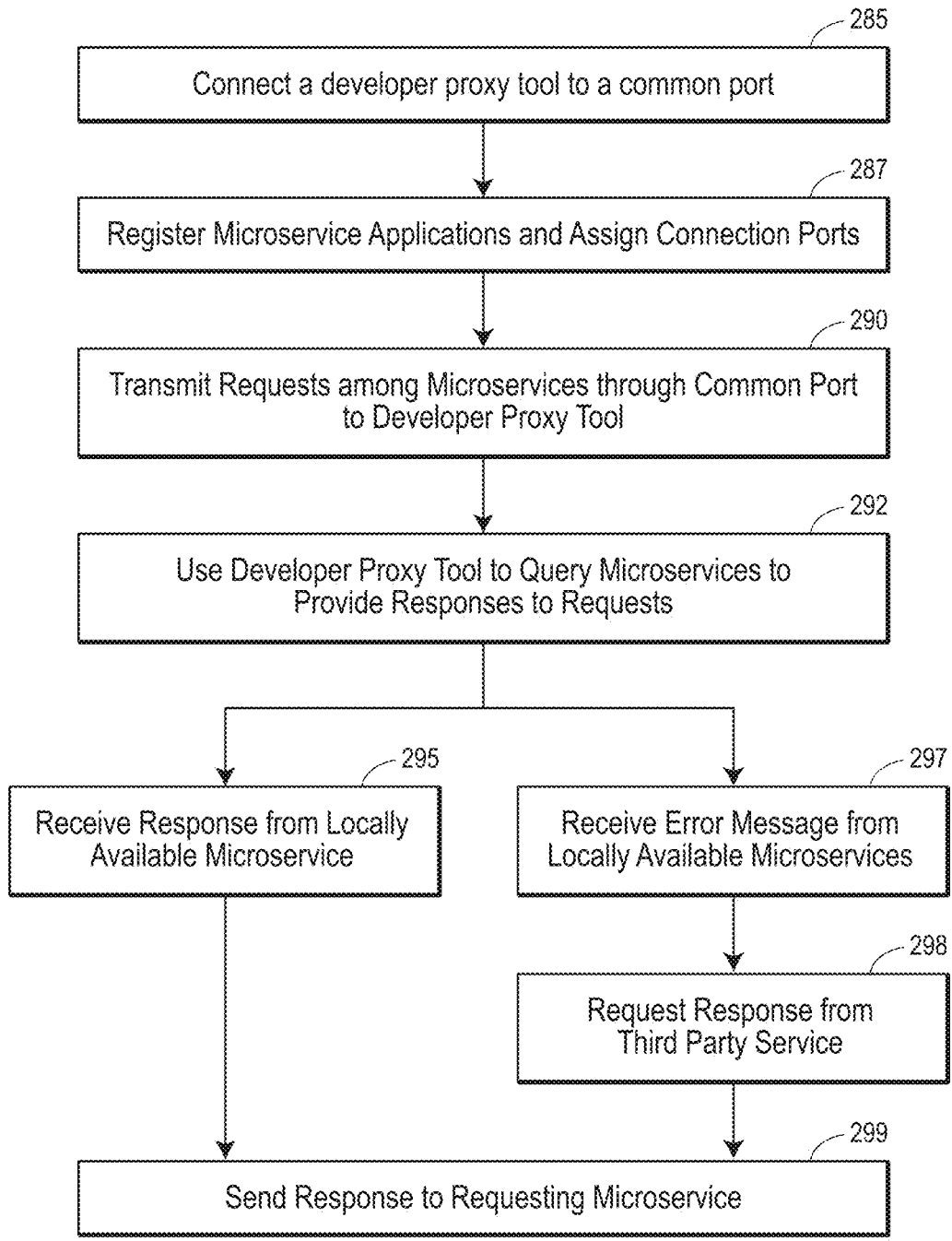
FIG. 2C is a schematic diagram showing aspects of a method of using a developer proxy tool in software development according to this disclosure.

FIGS. 2A-2C lay out non-limiting examples of the above discussed start script 200 to initiate the developer proxy tool 330. The computer implemented method of this disclosure, therefore, includes running the start script at 205 from the developer's computer 125 and/or a local server 175. FIG. 2A generally shows a computer implemented method of running the start script by entering into a computer certain answers to prompts presented on a graphical user interface regarding identifying the root path for a project at 225, identifying the common port at 230, and identifying the at least one microservice software application to run at 235. The answers to these prompts establish basic configuration settings at step 215. In non-limiting embodiments, each of the at least one microservice software applications 165, 350, 355, 360 communicate with the common port 375 as a base uniform resource locator.

FIG. 2B illustrates one non-limiting use of the developer proxy tool 330 during a software development project or software development task. In this example, steps of a method include identifying a root path 160 to a file directory for a software development project 265 and connecting a developer proxy tool 330 to a common port 375 on a data network 150, 190 and to a software development application 128 in use by a software developer 270. The developer proxy tool connects 275 at least one microservice software application 165 to the software development applications 128 through the common port 375 at step 275. In this way, the common port 375 routes communications 280 among the developer proxy tool 330, software development applications on the root path 160, and the at least one microservice software application 165.

FIG. 2C illustrates a more comprehensive series of instructions that the developer proxy tool 330 can accomplish with minimal manual effort by the software developer. In an implementation, a computer implemented method uses a developer proxy tool 300 stored in memory 610 on a computer 125, 175 to access microservice applications 165 for a software development project. The method includes connecting the developer proxy tool to a common port at on the computer at 285 and registering a plurality of the microservice applications to the developer proxy tool at 287. By assigning respective connection ports 287 for each of the plurality of microservice applications, the respective connection ports communicate with the developer proxy tool on the common port 375. The method includes providing an address for the common port to the plurality of microservice applications. At 290, transmitting data requests from at least one requesting microservice 165 to the developer proxy tool 330 occurs via the common port 375. The developer proxy tool sequentially queries selected microservice applications on the respective connection ports at 292 to determine availability of the selected microservice applications for completing a respective data request. The method includes receiving, at the common port, either a local microservice response 295 to the respective data request from one of the selected microservice applications or an error message 297 indicating that none of the plurality of microservice applications can fulfill the respective data request. Upon receiving the error, the proxy development tool directs the respective data request to a third party microservice application at 298 and receives a third party response to the respective data request. At 299, the method may further include sending the local microservice response or the third party response to the requesting microservice.

This disclosure also includes non-limiting embodiments of a computer program product embodied in a computer readable storage medium, that when executed by a computer processor, implements the developer proxy tool 330. The computer program product may include a first computer software component configured to prompt a user to enter project data that includes a root path 160 for a computer directory providing access to a software development application 128 in use by a software developer's computer 125. The first software component may also request identification of a common port 375 on a data network 150 for communicating with at least one microservice software application 165, 350, 355, 360. The first computer software component may also request identification of the at least one microservice software application to run with the software development application 128 that is already underway.

Additional sections of software may also be incorporated into the developer proxy tool 330 to implement a computerized method having steps of connecting the at least one microservice software application 165, 350, 355, 360 to the common port 375 and using the common port 375 to route communications among the developer proxy tool 330, software development applications on the root path 128, and the at least one microservice software application 165.

FIG. 1 shows the overall environment in which the software developer proxy tool 330 may operate, and FIGS. 3-5 shows more details of implementing a computerized method by accessing portions of computer memory connected to a processor to receive and transmit data requests 405 from the software development applications 128 and from the at least one microservice software application 165, 350, 355, 360 and to receive and transmit responses 430, 515 from the at least one microservice software application on the common port 375. The developer proxy tool 330 is assigned to a common port 375 that may be in communication with a range of port addresses, and certain port addresses correspond to the respective connection ports 1234, 1235, 1236 assigned to the plurality of microservice applications 350, 355, 360. The computer implemented method may include using the developer proxy tool 330 to poll the range of port addresses to determine at least one microservice application that is available on the computer 125 or on a local server 175 and equipped to send an appropriate local microservice response. As discussed in relation to FIG. 2C, upon none of the local microservices being available to process a request, the method includes contacting a third party microservice application 195 over the internet or across a cloud data connection. In some examples, the developer proxy tool 330 connects the third party microservice application to the developer proxy tool with a previously saved uniform resource locator (URL) stored on the computer. As illustrated in FIG. 1, the method may include connecting the plurality of microservice applications 165 to the common port 375 from the respective connection ports 1234, 1235, 1236 on the data network simultaneously.

In another aspect, a computer program product may be programmed to implement the above described methods. The computer program product may be stored in nonvolatile computer readable memory 635 to implement the developer proxy tool 330 used with a software development project on a computer 125, 175. The computer program product includes computer readable program code embodied in a non-transitory computer readable storage medium, the program code being executable by a processor 625 to perform operations. The operations include configuring a user interface for entering an address for a common port 375 for the developer proxy tool and registering a plurality of microservice applications 165 to the developer proxy tool. By assigning respective connection ports 1234, 1235, 1236 for each of the plurality of microservice applications, the respective connection ports communicate with the developer proxy tool 330 on the common port 375. The method includes providing an address for the common port 375 to the plurality of microservice applications. Transmitting data requests from at least one requesting microservice to the developer proxy tool occurs via the common port. The developer proxy tool 330 sequentially queries selected microservice applications 165 on the respective connection ports 1234, 1235, 1236 to determine availability of the selected microservice applications for completing a respective data request. The method includes receiving, at the common port 375, either a local microservice response to the respective data request from one of the selected microservice applications or an error message indicating that none of the plurality of microservice applications can fulfill the respective data request. Upon receiving the error, the proxy development tool directs the respective data request to a third party microservice application and receives a third party response to the respective data request. The method further includes sending the local microservice response or the third party response to the requesting microservice.

The computer program product may implement any or all of the steps of FIGS. 2A, 2B, and 2C. For example, the computer program product may be configured to operate with or initiate a user interface to prompt entry of a root directory 160 associated with the software development project. In some embodiments, the computer program product configures the developer proxy tool 330 with a range of port addresses that includes the respective connection ports 1234, 1235, 1236 assigned to the plurality of microservice applications. The computer program product uses the port addresses to determine if a requested microservice 165 is available locally to provide responses to requests that originate from the microservices or any other aspects of a given software development project. When the locally installed microservices are not available or not equipped to provide a response, the computer program product seeks a response from third party microservice applications that may be available on remote computers and servers, such as cross a cloud data connection. The third party microservice application may be available to the developer proxy tool with a previously saved uniform resource locator stored on the computer and available for access by the developer proxy tool as needed. The computer program product accesses portions of computer memory connected to a processor to receive and transmit the data requests from the plurality of microservice applications and to receive and transmit the local microservice response or the third party response on the common port, as discussed above.

In another aspect a system for completing a software development task includes a developer proxy tool having computer software components stored in computerized memory accessible by a local computer, wherein the computer software components are configured to prompt a user to enter project data. The project data may include an address for a common port on a data network for communicating with the developer proxy tool and identification of a plurality of microservice applications to run during the software development task. The computer software component implements a computerized method that includes assigning respective connection ports for each of the plurality of microservice applications, wherein the respective connection ports communicate with the developer proxy tool on the common port. The method includes providing an address for the common port to the plurality of microservice applications and transmitting data requests from at least one requesting microservice to the developer proxy tool via the common port. The developer proxy tool sequentially queries selected microservice applications on the respective connection ports to determine availability of the selected microservice applications for completing a respective data request. The developer proxy tool receives, at the common port, either a local microservice response to the respective data request from one of the selected microservice applications or an error message indicating that none of the plurality of microservice applications can fulfill the respective data request. Upon receiving the error, the proxy development tool directs the respective data request to a third party microservice application and receives a third party response to the respective data request. The proxy development tool may send sending the local microservice response or the third party response to the requesting microservice.

Embodiments of this disclosure may be implemented on numerous computers, servers, mobile devices, and the like that may be configured as a stand-alone apparatuses or as a system implemented on a communications network, so long as the components on the network incorporate sufficient hardware and software to execute the operations described below.

The present disclosure has been described with reference to example embodiments; however, persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments.

It is also important to note that the construction and arrangement of the elements of the system as shown in preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability.

Accordingly, all such modifications are intended to be included within the scope of the present disclosure. Other substitutions, modifications, changes, and omissions may be made in the design, operating conditions, and arrangement of the preferred and other exemplary embodiments without departing from the spirit of the present subject matter.

Figure 6:
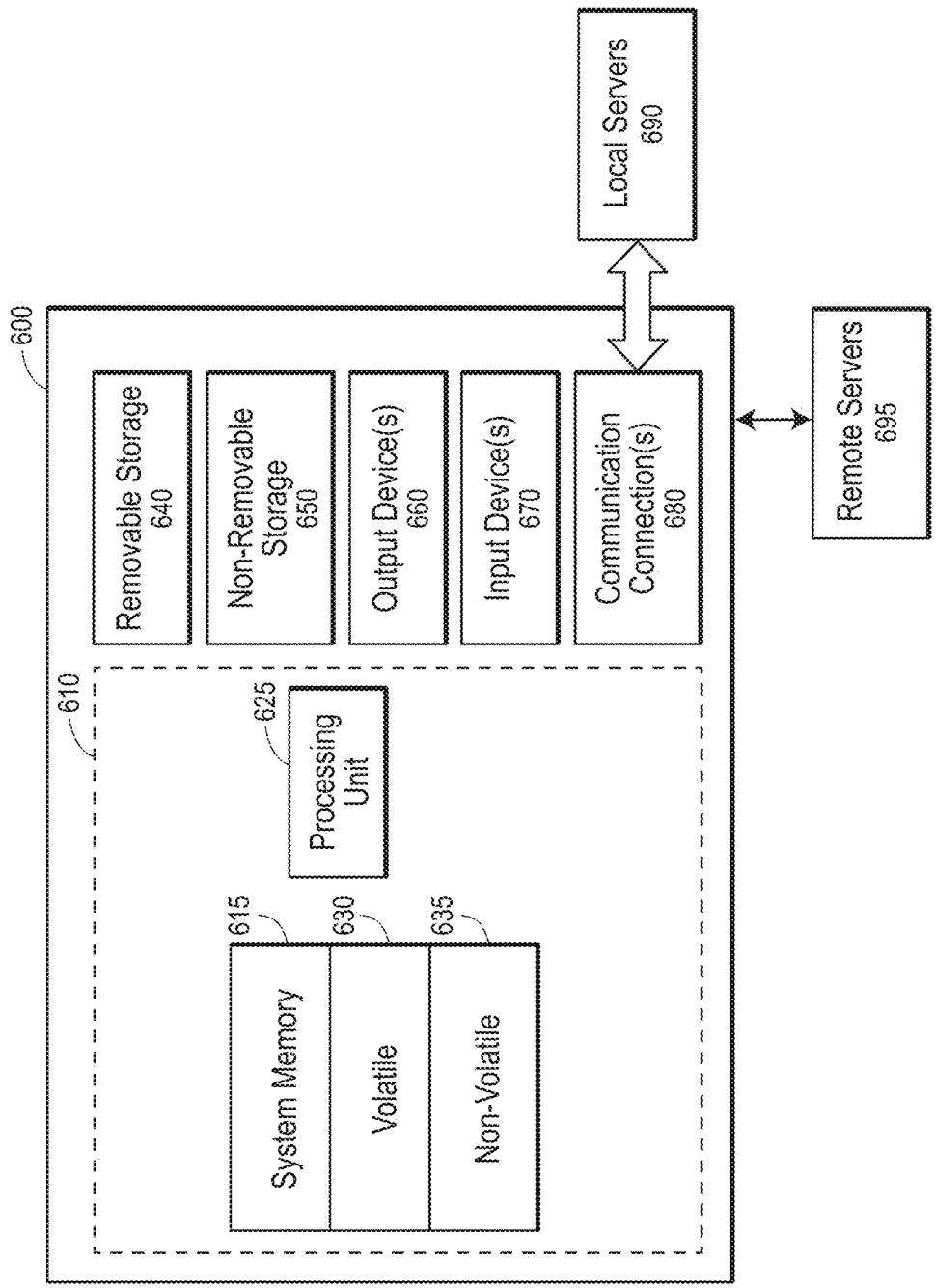
FIG. 6 is a schematic diagram of a computer having processors and computerized memory in accordance with this disclosure.

In example implementations, at least some portions of the activities may be implemented in software provisioned on a computer connected to other computers on a network. In some embodiments, one or more of these features may be implemented in computer hardware, provided in cloud based computing networks, or consolidated in any appropriate manner to achieve the intended functionality. In still other embodiments, these elements may include any suitable algorithms, hardware, software, components, modules, interfaces, or objects that facilitate the operations thereof. FIG. 6 illustrates one example of a computer 600 connected to other computers on a data communications network. This example of a networked device presents a non-limiting arrangement of the computer infrastructure that can be used in conjunction with developer proxy tool and associated system of this disclosure. For example, cloud connected servers may be configured with network interfaces for data communications with numerous local computers or other entities communicating on the network. FIG. 6 also includes references to numerous computerized components that may interact during a software development project discussed herein (i.e., at least one computer processing unit 625 in data communication with computerized memory 615, 630, 635 incorporating software that accepts inputs and outputs 660, 670 of all types for use in action-object processes, task based processing, task mapping, learning and training for artificial intelligence, and even adapting results to particular contexts within machine learning algorithms). Numerous network interfaces may connect network ports to each other and to a common port to accept data inputs from remote entities 695 (such as an application interface gateway) for processing options. These components are the kinds of computer hardware that may be utilized in both local and cloud-based data processing in numerous embodiments of this disclosure. FIG. 6 shows how computers of this disclosure may include standard kinds of removable storage devices 640, non-removable storage 650, and communications connections 680 to local servers 690 or remote servers 695.

Figure 7:
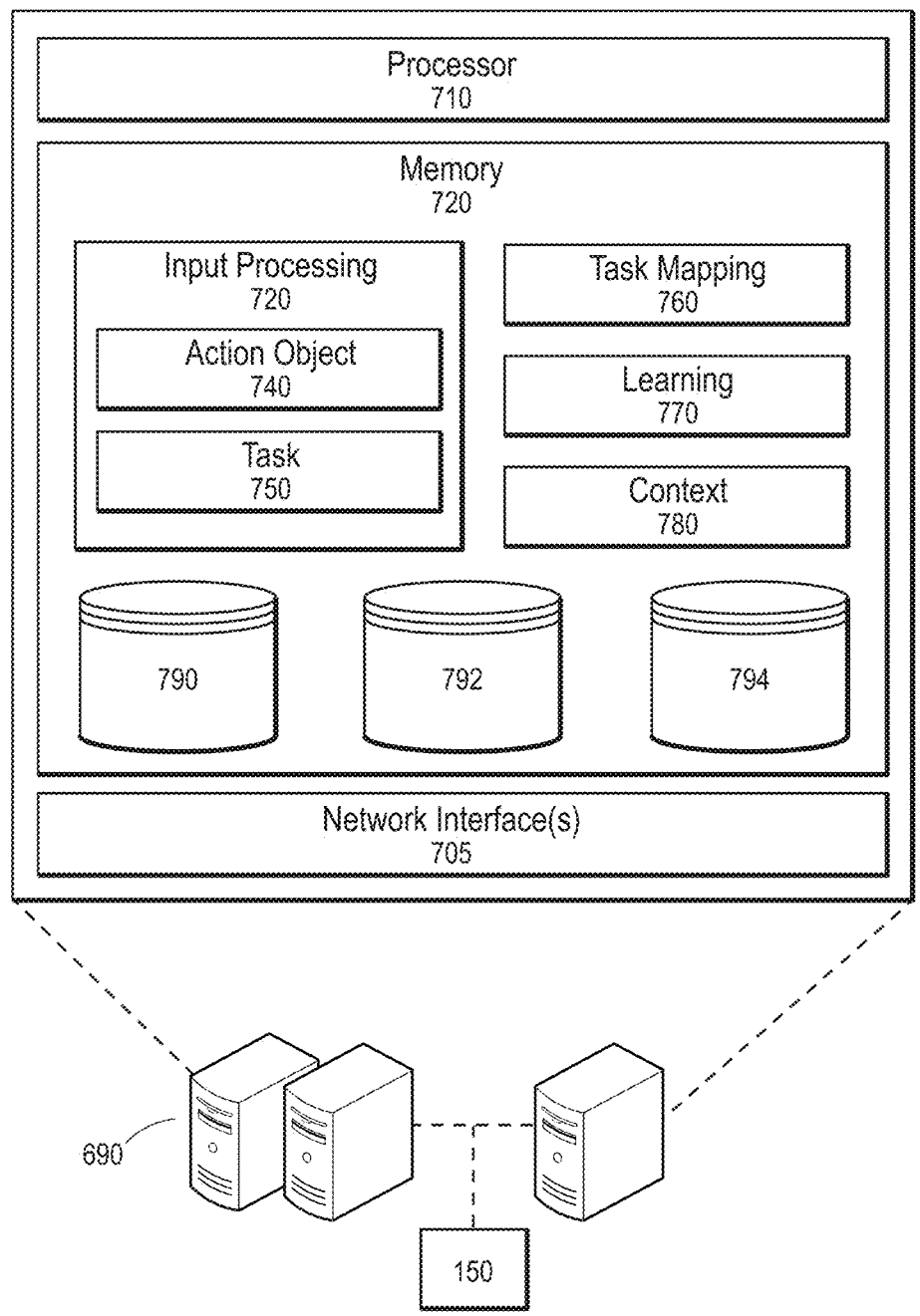
FIG. 7 is a schematic diagram of a computer having processors and computerized memory and accessing network resources in accordance with this disclosure.

FIG. 7 illustrates more examples of computer hardware that may be used in conjunction with network applications that implements aspects of this disclosure. In certain non-limiting embodiments, for example, a computer or a local server 700 and even remote computers processing high volume data requests and machine learning algorithms, may have special purpose arrangements of computer equipment sufficient to suit the needs of a software developer proxy tool 330. Again, computer hardware typically includes a processor (e.g., a CPU) 710 and system memory 720 (i.e., volatile memory and non-volatile memory). As discussed above, in one embodiment, the system memory of a computer implementing the developer proxy tool may include designated memory for storing message data, data requests, processing requests, and other information that needs to be retained prior to processing by a developer using software developer tools. FIG. 7 illustrates non-limiting kinds of hardware and software that can be used to implement this disclosure, including software for input processing steps 730, action object processing 740, task based processing 750, task mapping 760, artificial intelligence and machine learning 770, and even developing algorithms for the computer to understand a context 780 of certain data. The hardware used is generally shown in drives 790, 792, 794. The computers 700 are often equipped with network interfaces 705 that connect the computers to other computers and servers 690 across a local data connection 150.

In some example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer-readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor), and the elements identified herein could be some type of a programmable processor, programmable digital logic (e.g., a field-programmable gate array (FPGA), an erasable programmable read only memory (EPROM), an electrically erasable programmable read only memory (EEPROM)), an ASIC that includes digital logic, software, code, electronic instructions, flash memory, magnetic or optical cards, other types of machine-readable mediums suitable for storing electronic instructions, or any suitable combination thereof.

These devices may further keep information in any suitable type of non-transitory storage medium (e.g., random access memory (RAM), read-only memory (ROM), field-programmable gate array (FPGA), erasable programmable read-only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method of using a developer proxy tool stored in memory on a computer to access a plurality of microservice applications for a software development project, the computer implemented method comprising:

connecting, by one or more processors, the developer proxy tool to a common port on the computer;

registering, by the one or more processors, the plurality of microservice applications to the developer proxy tool;

assigning, by the one or more processors, respective connection ports for each of the plurality of microservice applications, wherein the respective connection ports communicate with the developer proxy tool on the common port;

providing, by the one or more processors, an address for the common port to the plurality of microservice applications;

transmitting, by the one or more processors, one or more data requests from at least one requesting microservice application of the plurality of microservice applications to the developer proxy tool via the common port;

sequentially querying, by the one or more processors and using the developer proxy tool, selected ones of the plurality of microservice applications on the respective connection ports to determine availability of the selected ones of the plurality of microservice applications for completing a respective data request of the one or more data requests;

receiving, by the one or more processors and at the common port, either a local microservice response to the respective data request from one of the selected ones of the plurality of microservice applications or an error message indicating that none of the selected ones of the plurality of microservice applications can fulfill the respective data request;

using, by the one or more processors and upon receiving the error message, the developer proxy tool to direct the respective data request to a third-party microservice application and receiving a third-party response to the respective data request; and sending, by the one or more processors, the local microservice response or the third-party response to the at least one requesting microservice application.

2. The computer implemented method according to claim 1, further comprising configuring, by the one or more processors, the developer proxy tool with a range of port addresses that includes the respective connection ports assigned to the plurality of microservice applications.

3. The computer-implemented method according to claim 2, further comprising using, by the one or more processors, the developer proxy tool to poll the range of port addresses to determine at least one of the plurality of microservice applications that is available on the computer or on a local server and equipped to send the local microservice response.

4. The computer-implemented method according to claim 1, further comprising contacting, by the one or more processors, the third-party microservice application across a cloud data connection.

5. The computer-implemented method according to claim 4, further comprising connecting, by the one or more processors, the third-party microservice application to the developer proxy tool with a previously saved uniform resource locator stored on the computer.

6. The computer-implemented method of claim 1, further comprising connecting, by the one or more processors, the plurality of microservice applications to the common port from the respective connection ports on a data network simultaneously.

7. The computer-implemented method of claim 1, further comprising running, by the one or more processors, a start script to initiate the developer proxy tool.

8. The computer-implemented method of claim 7, wherein running the start script comprises entering, into the computer, answers to prompts presented on a graphical user interface regarding identifying a root path for the software development project, identifying the common port, and identifying at least one of the plurality of microservice applications to run.

9. The computer-implemented method of claim 1, wherein each of the plurality of microservice applications communicates with the common port as a base uniform resource locator.

10. The computer-implemented method of claim 9, wherein the plurality of microservice applications comprises a selection of microservices that operate simultaneously within the software development project.

11. The computer-implemented method of claim 1, wherein the common port to the developer proxy tool establishes an exclusive communications connection between the plurality of microservice applications and the computer.

12. One or more non-transitory computer-readable media storing processor-executable instructions that, when executed by one or more processors, cause the one or more to perform operations for using a developer proxy tool stored in memory on a computer to access a plurality of microservice applications for a software development project comprising:
configuring a user interface for entering an address of a common port for the developer proxy tool and registering the plurality of microservice applications to the developer proxy tool, the developer proxy tool being stored in memory on a computer;
assigning respective connection ports for each of the plurality of microservice applications, wherein the respective connection ports communicate with the developer proxy tool on the common port;
providing an address for the common port to the plurality of microservice applications;
transmitting one or more data requests from at least one requesting microservice application of the plurality of microservice applications to the developer proxy tool via the common port;
sequentially querying, using the developer proxy tool, selected ones of the plurality of microservice applications on the respective connection ports to determine availability of the selected ones of the plurality of microservice applications for completing a respective data request of the one or more data requests;
receiving, at the common port, either a local microservice response to the respective data request from one of the selected ones of the plurality of microservice applications or an error message indicating that none of the selected ones of the plurality of microservice applications can fulfill the respective data request;
using, upon receiving the error message, the developer proxy tool to direct the respective data request to a third-party microservice application and receiving a third party response to the respective data request; and
sending the local microservice response or the third-party response to the at east one requesting microservice application.

13. The one or more non-transitory computer-readable media of claim 12, wherein the operations further comprise configuring the user interface to prompt entry of a root directory associated with a software development project.

14. The product one or more non-transitory computer-readable media of claim 13, wherein the developer proxy tool searches the root directory for the plurality of microservice applications to be registered.

15. The one or more non-transitory computer-readable media of claim 13, wherein the operations further comprise configuring the developer proxy tool with a range of port addresses that includes the respective connection ports assigned to the plurality of microservice applications.

16. The one or more non-transitory computer-readable media of claim 13, wherein the operations further comprise contacting the third-party microservice application across a cloud data connection.

17. The one or more non-transitory computer-readable media of claim 12, wherein the operations further comprise connecting the third-party microservice application to the developer proxy tool with a previously saved uniform resource locator stored on the computer.

18. The one or more non-transitory computer-readable media of claim 12, wherein the operations further comprise accessing portions of computer memory connected to the one or more processors to receive and transmit the one or more data requests from the at least one requesting microservice application of the plurality of microservice applications and to receive and transmit the local microservice response or the third party response on the common port.

19. A system for completing a software development task comprising:
one or more processors;
a computerized memory accessible by a local computer and storing a developer proxy tool comprising a computer software component, wherein the computer software component is configured to prompt a user to enter project data comprising an address for a common port on a data network for communicating with the developer proxy tool and identification of a plurality of microservice applications to run during the software development task, and wherein the computer software component, when executed by the one or more processors, causes the one or more processors to perform operations comprising:
assigning respective connection ports for each of the plurality of microservice applications, wherein the respective connection ports communicate with the developer proxy tool on the common port;
providing the address for the common port to the plurality of microservice applications;
transmitting one or more data requests from at least one requesting microservice application of the plurality of microservice applications to the developer proxy tool via the common port;
sequentially querying, using the developer proxy tool, selected ones of the plurality of microservice applications on the respective connection ports to determine availability of the selected ones of the plurality of microservice applications for completing a respective data request of the one or more data requests;
receiving, at the common port, either a local microservice response to the respective data request from one of the selected ones of the plurality of microservice applications or an error message indicating that none of the selected ones of the plurality of microservice applications can fulfill the respective data request;
using, upon receiving the error message, the developer proxy tool to direct the respective data request to a third-party microservice application and receiving a third-party response to the respective data request; and
sending the local microservice response or the third-party response to the at least one requesting microservice application.

20. The system of claim 19, further comprising a remote computer in electronic communication with the developer proxy tool and running the third-party microservice application over a cloud data connection.

* * * * *

UNITED STATES PATENT AND TRADEMARK OFFICE
CERTIFICATE OF CORRECTION

PATENT NO. : 12,229,553 B2
APPLICATION NO. : 18/050746
DATED : February 18, 2025
INVENTOR(S) : Henry Spivey et al.

Page 1 of 1

It is certified that error appears in the above-identified patent and that said Letters Patent is hereby corrected as shown below:

In the Claims

At Column 13, Line 21, "more" should be -- more processors --.

At Column 13, Line 58, "east" should be -- least --.

At Column 13, Line 64, "The product one" should be -- The one --.

Signed and Sealed this
First Day of July, 2025

Coke Morgan Stewart
*Acting Director of the United States Patent and Trademark Office*